US006697952B1

United States Patent
King

(10) Patent No.: US 6,697,952 B1
(45) Date of Patent: Feb. 24, 2004

(54) MARGINING PROCESSOR POWER SUPPLY

(75) Inventor: Joseph D. King, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 503 days.

(21) Appl. No.: 09/624,160

(22) Filed: Jul. 24, 2000

(51) Int. Cl.[7] ............................................... G06F 1/26
(52) U.S. Cl. ........................ 713/300; 713/340; 327/538
(58) Field of Search ...................... 713/300; 327/538, 327/544

(56) References Cited

U.S. PATENT DOCUMENTS

| | | | | |
|---|---|---|---|---|
| 5,705,920 A | * | 1/1998 | Watanabe et al. | 323/285 |
| 5,774,736 A | * | 6/1998 | Wright et al. | 713/330 |
| 6,157,974 A | * | 12/2000 | Gasparik | 710/302 |
| 6,185,139 B1 | * | 2/2001 | Pantelakis et al. | 365/201 |
| 6,316,988 B1 | * | 11/2001 | Forehand et al. | 327/538 |
| 6,340,918 B2 | * | 1/2002 | Taylor | 330/292 |
| 6,351,827 B1 | * | 2/2002 | Co et al. | 714/42 |
| 6,425,086 B1 | * | 7/2002 | Clark et al. | 713/322 |
| 6,525,599 B2 | * | 2/2003 | Nguyen et al. | 327/544 |
| 6,600,302 B2 | * | 7/2003 | Ghozeil et al. | 323/313 |

FOREIGN PATENT DOCUMENTS

JP 05158572 A * 6/1993 ............. G06F/1/04

OTHER PUBLICATIONS

IBM TDB, Brushless DC Motor Fault Detection, Dec. 1, 1994, vol. 37 issue 12, pp. 281–282.*

* cited by examiner

Primary Examiner—Thomas Lee
Assistant Examiner—Mark Connolly
(74) Attorney, Agent, or Firm—Baker Botts L.L.P.

(57) ABSTRACT

A system and method for biasing supply voltage requirements that are input to a voltage regulator to facilitate testing a computer system with supply voltages above and below specified operating values. The present invention may also be used to compensate a voltage regulator that is not outputting the supply voltage required by the computer system. The system includes a processor voltage signal indicative of supply voltage required by one or more components in a computer system during operation, at least one other voltage signal indicative of margined or biased supply voltage for the computer system, and a selection control signal for selecting between the processor voltage signal and the at least one other voltage signal. The processor voltage signal, the at least one other voltage signal, and the selection control signal, are input to a multiplexer. The multiplexer outputs a voltage identification signal to the voltage regulator based on the processor voltage signal, the at least one other voltage signal, and the selection control signal.

6 Claims, 4 Drawing Sheets

MARGINING PROCESSOR POWER SUPPLY

BACKGROUND OF THE INVENTION

1. Field of the Invention

This invention generally relates to the field of power supplies for electronic equipment. More specifically, this invention relates to an apparatus for margining the input voltage command to a voltage regulator.

2. Description of the Related Art

Some voltage regulators, particularly those packaged as a voltage regulator module (VRM), are voltage ID (VID) programmable, which means that the microprocessor can program the voltage regulator to provide the correct voltage during power-up. Proper voltage must be supplied to the processor for reliable operation. Voltage may be supplied by a regulator on the motherboard, or by a VRM (Voltage Regulator Module) installed on the motherboard.

Computer system manufacturers typically assemble a variety of components such as microprocessors, input/output devices, storage devices, and video and audio devices in their products. Many of the components utilize solid state logic circuits that manufacturers test at nominal operating voltages, as well as voltages at margins of tolerance about the nominal values. These tests are conducted to determine the susceptibility of the system to fluctuations in supply voltage.

Currently, supply voltages are modified by manually adjusting the output of the power supply. This method has the drawbacks of being time consuming and costly. It is also prone to errors such as incorrectly adjusting the voltage. It is therefore desirable to supply an apparatus capable of adjusting the output of the power supply electronically and automatically during test mode. This apparatus may also be utilized to adjust the power supply to the nominal voltage value when supply voltage fluctuations occur.

SUMMARY OF THE INVENTION

The present invention provides a system and method for biasing supply voltage requirements that are input to a voltage regulator to facilitate testing a computer system with supply voltages above and below specified operating values. The present invention may also be used to compensate a voltage regulator that is not outputting the supply voltage required by the computer system.

The system includes a processor voltage signal indicative of supply voltage required by one or more components in a computer system during operation, at least one other voltage signal indicative of supply voltage for a computer system, and a selection control signal for selecting between the processor voltage signal and the at least one other voltage signal. The processor voltage signal, the at least one other voltage signal, and the selection control signal, are input to a multiplexer. The multiplexer outputs a voltage identification signal to the voltage regulator based on the processor voltage signal, the at least one other voltage signal, and the selection control signal.

In one embodiment, one of the at least one other voltage signals is a margin voltage signal indicative of supply voltage input to the computer system during test conditions.

In another embodiment, the supply voltage being provided by the voltage regulator is not within tolerance of the supply voltage required by the computer system. In this situation, one of the at least one other voltage signals is a margin voltage signal that includes a bias that is input to the voltage regulator to compensate the supply voltage to the voltage required by the computer system. Program logic may be included in the system to determine the bias to add to the margin voltage signal.

One feature of the present invention may include program logic to determine when the selection control signal should indicate that the processor voltage signal should be selected by the multiplexer.

Another feature of the present invention may include program logic to determine when the selection control signal should indicate that one of the other voltage signals should be selected by the multiplexer.

In another embodiment, the method for biasing supply voltage requirements that are input to a voltage regulator includes:

inputting the processor voltage signal to the multiplexer, wherein the processor voltage signal is indicative of supply voltage required by one or more components in a computer system during operation;

inputting at least one other voltage signal indicative of supply voltage for a computer system to the multiplexer;

inputting a selection control signal to the multiplexer, wherein the selection control signal indicates a selection between the processor voltage signal and the at least one other voltage signal; and outputting a voltage identification signal from the multiplexer to the voltage regulator, wherein the voltage identification signal is set to the processor voltage signal or the at least one other voltage signal, based on the selection control signal.

The present method may be used to test the computer system using supply voltages that are above or below specified operating voltages by setting one of the at least one other voltage signals to a desired value and inputting it as the voltage identification signal to the voltage regulator.

Alternatively, this method may be used to bias at least one of the other voltage signals to compensate the supply voltage to the voltage required by the computer system. This is useful when the supply voltage being provided by the voltage regulator is not within tolerance of the supply voltage required by the computer system.

One feature of the method includes determining when the selection control signal should indicate that the processor voltage signal should be selected by the multiplexer.

Another feature of the method includes determining when the selection control signal should indicate that one of the other voltage signals should be selected by the multiplexer.

Yet another feature of the method includes determining the bias to add to the margin voltage signal.

Thus, the present invention advantageously provides an apparatus and method for driving the voltages applied to a computer system to marginal values to test whether the computer system meets desired specifications.

The present invention also advantageously provides an apparatus and method for compensating for errors in the supply voltage output by the voltage regulator.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
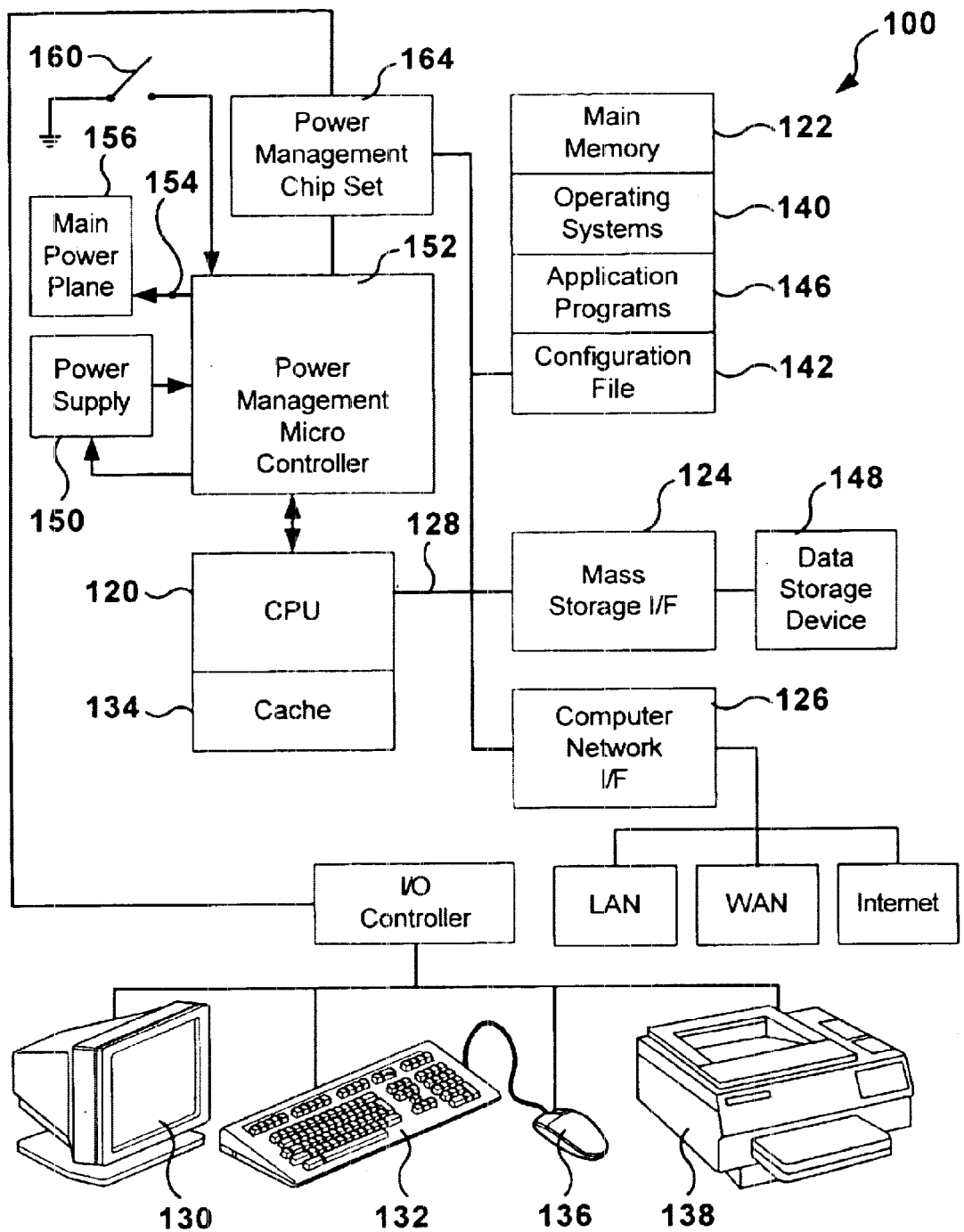
FIG. 1 is a block diagram of an example of a computer system with which the present invention may be utilized.

Referring now to FIG. 1, a diagram of components commonly included in a computer system 100 with which the present invention may be utilized is shown. Those skilled in the art will appreciate, however, that the present invention may be utilized in other systems that requires an input voltage to be adapted to supply power to two or more electrically-operated components within the system, with computers being one example.

Computer system 100 includes a central processing unit (CPU) 120, main memory 122, mass storage interface 124, and network interface 126, all connected by system bus 128. Note that system bus 128 may be a collection of several individual special purpose data busses known in the art such as a CPU bus, local bus, EISA bus, and/or SCSI bus. Computer system 100 encompasses all types of computer systems: personal computers, midrange computers, mainframes, etc. Note that many additions, modifications, and deletions can be made to this computer system 100 when used with the present invention. Examples of this are computer display 130, input keyboard 132, cache memory 134, and peripheral devices such as mouse 136 and printer 138. Computer system 100 may be one of many workstations connected to a local area network (LAN), a wide area network (WAN), or a global information network such as the Internet.

CPU 120 can be constructed from one or more microprocessors and/or integrated circuits. Main memory 122 stores programs and data that the CPU 120 may access. When computer system 100 starts up, CPU 120 initially executes the operating system 140 program instructions. Operating system 140 is a program that manages the resources of the computer system 100, such as the CPU 120, main memory 122, mass storage interface 124, network interface 126, and system bus 128. The operating system 140 reads one or more configuration files 142 to determine the hardware and software resources connected to the computer system 100.

Mass storage interface 124 allows computer system 100 to retrieve and store data from auxiliary storage devices such as magnetic disks (hard disks, diskettes) and optical disks (CD-ROM). The mass storage devices are commonly known as Direct Access Storage Devices (DASD), and act as a permanent store of information. The information from the DASD can be in many forms including application programs and program data. Data retrieved through mass storage interface 124 is usually placed in main memory 122 where CPU 120 can process it.

Although computer system 100 is shown to contain only a single main CPU 120 and a single system bus 128, those skilled in the art will appreciate that the present invention may be practiced using a computer system that has multiple CPUs 120 and/or multiple busses 128. In addition, the interfaces that are used in the preferred embodiment may include separate, fully programmed microprocessors that are used to off-load computationally intensive processing from CPU 120, or may include input/output (I/O) adapters to perform similar functions.

Computer system 100 receives power from power supply 150 which provides power for the many components included in computer system 100. Power supply 150 receives input power from one or more sources such as an AC wall outlet and/or battery (not shown), and outputs one or more power signals to power management microcontroller 152. Different electrically-operated components in computer system 100 may require different levels of DC voltage for operation. Power supply 150 typically includes regulator circuitry for converting AC voltage from an AC power source or DC voltage from an unregulated DC power source to precisely regulated levels of DC voltage. Microcontroller 152 determines when to charge the battery, provides feedback voltage signals to power supply 150, and controls the distribution of voltage signals to the main power plane 156 and power management chip set 164. Microcontroller 152 monitors the charge level of power supply 150. Microcontroller 152 is coupled to a main power switch 160 which the user actuates to turn the computer system 100 on and off. While microcontroller 152 powers down other portions of computer system 100 such as mass storage devices 148 when not in use to conserve power, microcontroller 152 itself is always coupled to a source of energy, namely power supply 150.

Computer system 100 also includes a power management chip set 164 coupled to CPU 120 via bus 128 so that power management chip set 164 can receive power control commands from CPU 120. Power management chip set 164 is connected to a plurality of individual power planes (not shown) which supply power to respective devices in computer system 100 such as mass storage devices 148, for example. In this manner, power management chip set 164 acts under the direction of CPU 120 to control the power to the various power planes and devices of computer system 100.

Some types of computer systems 100 implement a feature commonly referred to a voltage ID (VID), as known in the art. This feature allows CPU 120 to specify how many volts the voltage regulator should supply. For example, Pentium II processors manufactured by Intel may have one configuration that requires 2.8 volts, and another configuration that requires 2.0 volts. The voltage value requested by CPU 120 to power management microcontroller 152 is referred to as the voltage ID (VID).

An example of a voltage identification table for an Intel processor is shown in Table 1, in which the VID definitions are shown for each voltage. The 5 VID pins are assigned in a connector that couple the voltage regulator to power management microcontroller 152. In this example, the VID pins define CPU core voltages (Vcc) ranging from 1.8 volts to 3.5 volts. A value of "1" refers to an "open" pin, while "0" refers to a short to ground. These pins can be used to support automatic selection of power supply voltages. These pins are not signals, but are either an open circuit or a short circuit to supply voltage, Vss, on the processor. The combination of opens and shorts defines the voltage required by the processor core.

TABLE 1

| Processor Voltage ID Pins | | | | | |
|---|---|---|---|---|---|
| VID4 | VID3 | VID2 | VID1 | VID0 | Vcc Core |
| 0 | 1 | 0 | 0 | 1 | 1.60 |
| 0 | 1 | 0 | 0 | 0 | 1.65 |
| 0 | 0 | 1 | 0 | 1 | 1.80 |

TABLE 1-continued

| Processor Voltage ID Pins | | | | | |
|---|---|---|---|---|---|
| VID4 | VID3 | VID2 | VID1 | VID0 | Vcc Core |
| 0 | 0 | 1 | 0 | 0 | 1.85 |
| 0 | 0 | 0 | 1 | 1 | 1.90 |
| 0 | 0 | 0 | 0 | 1 | 2.0 |
| 0 | 0 | 0 | 0 | 0 | 2.05 |
| 1 | 1 | 1 | 1 | 1 | No Core |

In some situations, it is desirable to alter the voltage ID sent to voltage regulator. One situation occurs to test operation of an assembly of components in computer system 100 when supply voltage is off the nominal value. For example, if the voltage supplied to CPU 120 is nominally 2.0 volts, a manufacturer may additionally test operation with voltages of 1.95 volts and 2.05 volts. Another situation occurs when the voltage regulator supplies a different voltage than the voltage commanded. In this situation, control logic in microcontroller 152 can modify the voltage command to the voltage regulator to bring the output within specification.

Figure 2:
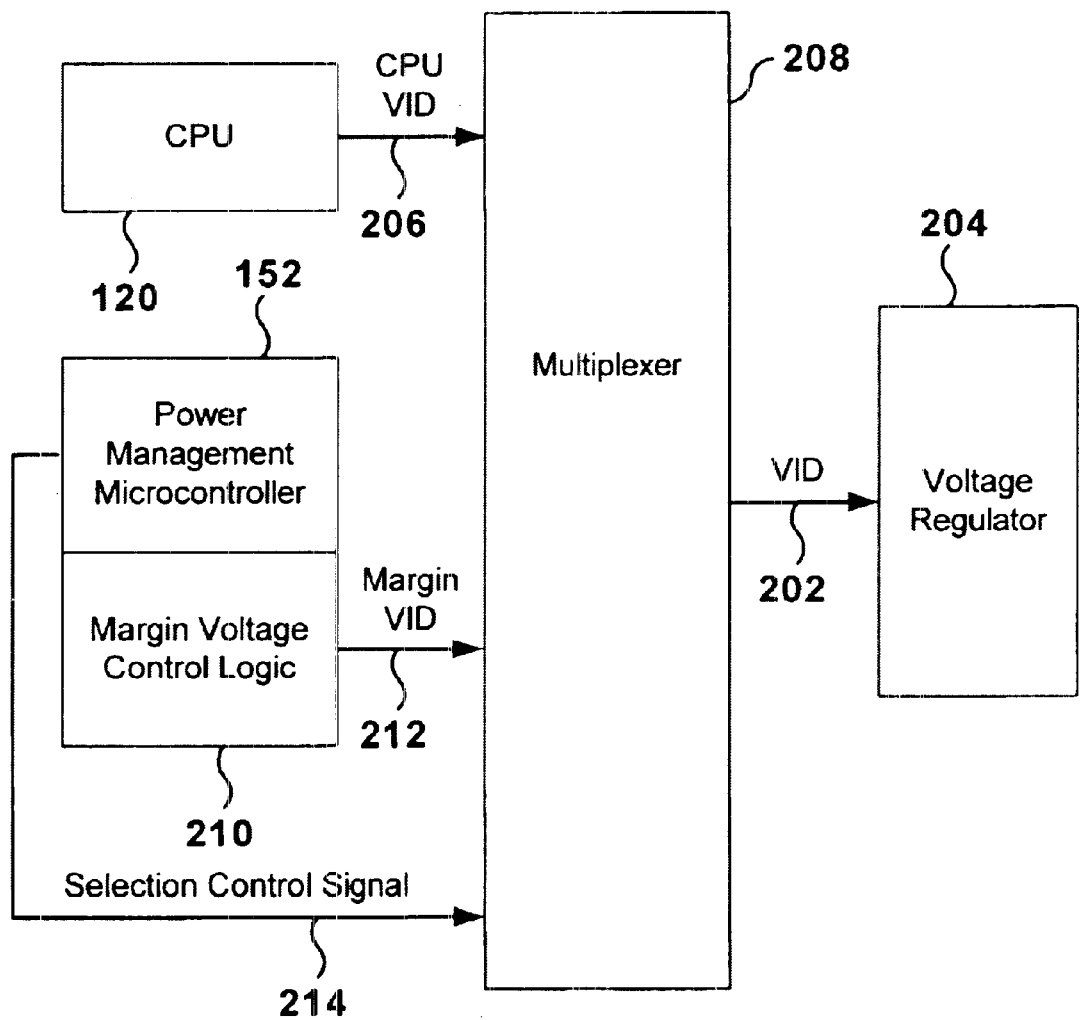
FIG. 2 is a diagram of components included in a computer system in accordance with one embodiment of the present invention.

FIG. 2 shows a block diagram of components that may be included in computer system 100 (FIG. 1) to modify VID signal 202 that is input to voltage regulator 204, in accordance with one embodiment of the present invention. CPU 120 provides CPU VID signal 206 to multiplexer 208. The CPU VID signal 206 represents the core voltage for operating CPU 120. Margin voltage control logic 210 receives a request to output a particular margin VID signal 212 to multiplexer 208. The request may be input by a user through a user interface, or program logic may select margin VID signal 212 based on user-programmed criteria. For example, when testing the operation of computer system 100 at margined voltage levels, the margin voltage control logic 210 may select margin VID signal 212 based on plus and minus tolerance voltages about CPU VID signal 206. As another example, if power management controller 152 senses that the supply voltage signal Vss from voltage regulator 204 to CPU 120 does not match the VID signal 206, margin voltage control logic 210 may set margin VID signal 202 to offset the discrepancy and bring the voltage output by voltage regulator 204 up to the value specified by CPU 120.

Multiplexer 208 is known in the art and is commercially available through a number of manufacturers. Selection control signal 214 is used in multiplexer 208 to select between CPU VID signal 206 and margin VID signal 212. Selection control signal 214 may be set by a user through a user interface, or alternatively, by program logic that is internal or external to computer system 100, such as logic in microcontroller 152 or margin voltage control logic 210.

Figure 3A:
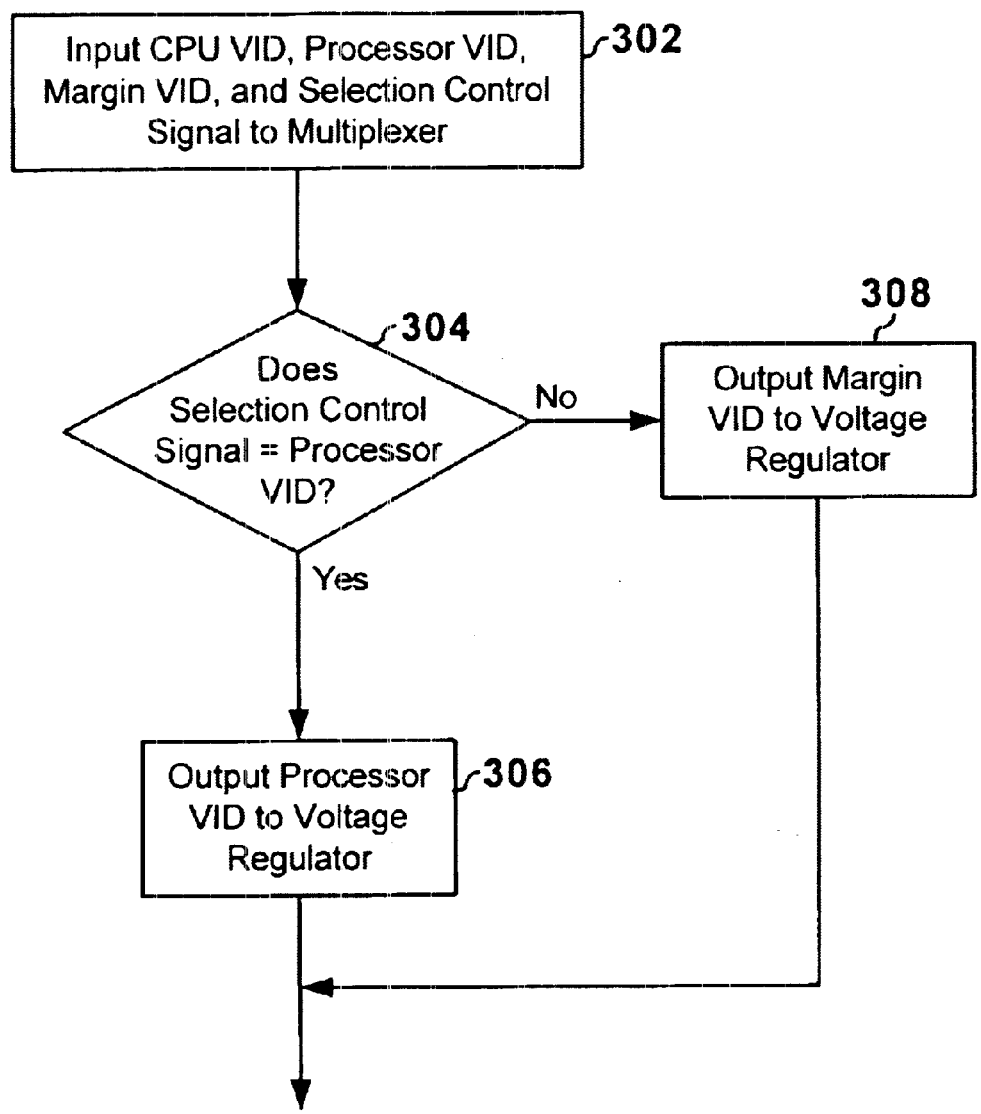
FIGS. 3a and 3b are flowcharts of a method for adjusting power supplied to a computer system according to the present invention.
Figure 3B:
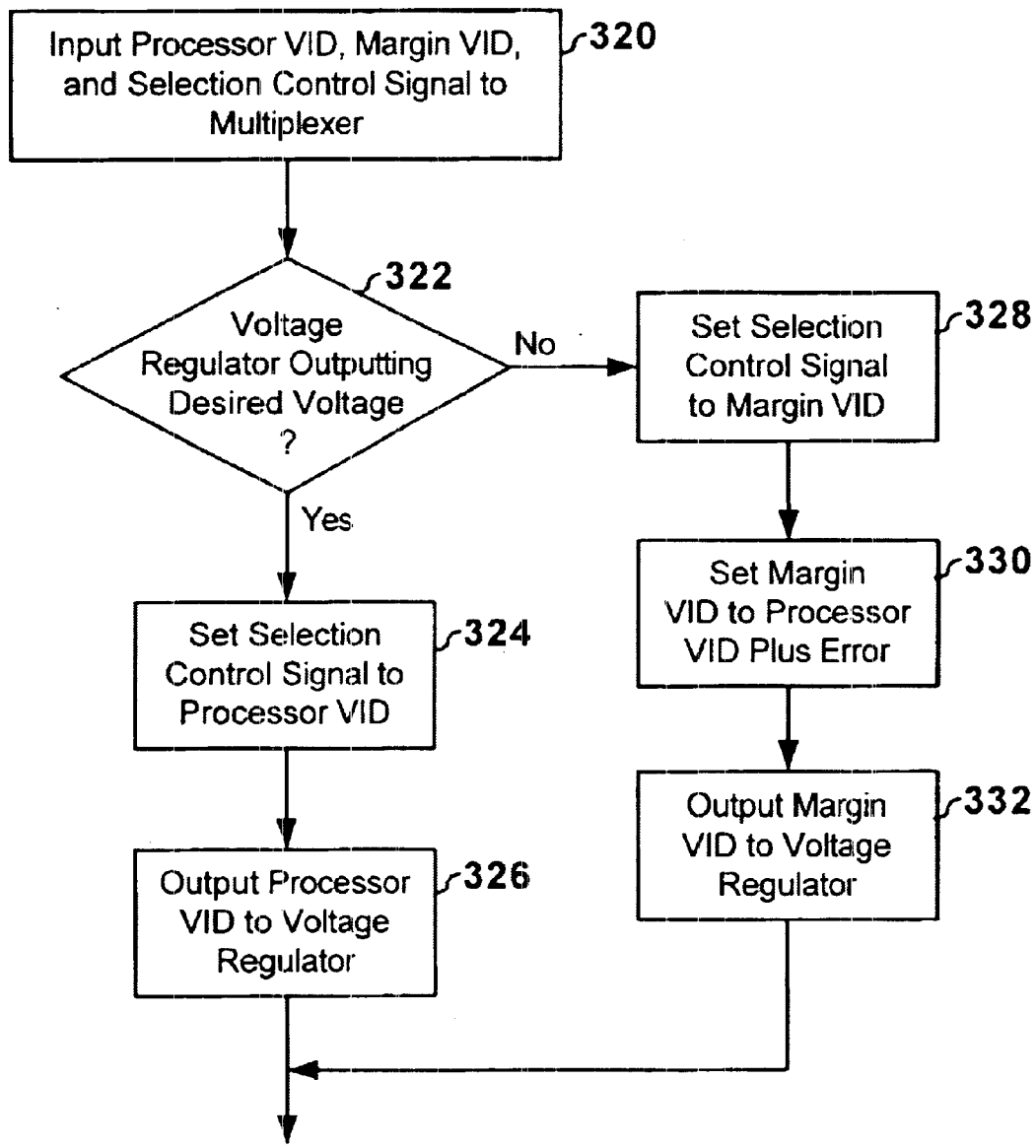

Flowcharts of logic that may be implemented to utilize the present invention are shown in FIGS. 3a and 3b. Referring to FIGS. 2, 3a, and 3b, FIG. 3a shows processes in a method for margining VID signal 202 to voltage regulator 204 which is utilized to test operation of computer system 100 when supply voltages are above or below a specified operating voltage. FIG. 3b shows processes in a method for supplying a biased VID signal 202 to voltage regulator 204 when, for some reason, voltage regulator 204 does not supply the voltage specified by CPU VID signal 206.

In FIG. 3a, process 302 shows CPU VID signal 206, margin VID signal 212, and selection control signal 214 being input to multiplexer 208. Multiplexer 208 includes logic to select either CPU VID signal 206 or margin VID signal 212 based on selection control signal 214, as represented by process 304. This logic may be implemented in hardware, software, or a combination of hardware and software, as known in the art. When CPU VID signal 206 is selected, multiplexer 208 outputs CPU VID signal 206 as VID signal 202, as shown in process 306. When margin VID signal 212 is selected, multiplexer 208 outputs margin VID signal 212 as VID signal 202, as shown in process 308.

In FIG. 3b, process 320 shows CPU VID signal 206, margin VID signal 212, and selection control signal 214 being input to multiplexer 208. An indicator, such as flag or a variable having a numerical value, is tested to determine whether the voltage regulator 204 is outputting supply voltage within a specified tolerance of VID signal 202. If so, control passes to process 324, where selection control signal 214 is set so that multiplexer 208 outputs CPU VID signal 206 as VID signal 202 in process 326.

If voltage regulator 204 is not outputting supply voltage within a specified tolerance of VID signal 202, control passes to process 328. In process 328, margin VID signal 212 is set to CPU VID signal 206 plus the error between the specified VID signal and the actual supply voltage being output by voltage regulator 204. In process 330, margin VID signal 212 is set to CPU VID signal 206 and adjusted for the difference between the voltage supplied by voltage regulator 204 and CPU VID signal 206. This biases VID signal 202 so that the supply voltage is closer to the voltage required by CPU 120. Multiplexer 208 outputs margin VID signal 212 as VID signal 212 in process 332. Processes 324, 328, and 330 occur outside of multiplexer 208, and may be implemented in margin voltage control logic 210, microcontroller 152, or some other component of computer system 100.

FIG. 2 shows only two signals, that is, CPU VID signal 206 and margin VID signal 212, being input to multiplexer 208. Thus, selection control signal 214 may be implemented with a bit flag that is either on or off. In other embodiments of the present invention, more than two margin signals, processor VID signals, and/or other types of signals may be input to multiplexer 208, and selection control signal 214 is then implemented with a variable that may be set to more than two values.

Thus, in one embodiment, the present invention advantageously provides an apparatus and method for driving the voltages applied to CPU 120 to marginal values to test whether the computer system 100 meets desired specifications. The margin VID signal 212 may be set to one or more desired values for test purposes. Further, use of the margin VID signal 212 can be controlled by a user or by program logic through selection control signal 214.

The present invention also advantageously provides an apparatus and method for compensating for errors in the supply voltage output by voltage regulator 204. Logic may be implemented in computer system 100 to detect discrepancies between the CPU VID signal 206 and the voltage output by voltage regulator 204. When a discrepancy exists, the margin VID 212 can be used to compensate the input VID signal 202 to voltage regulator 204 so that the desired supply voltage is output from voltage regulator 204.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A system for biasing supply voltage requirements that are input to a voltage regulator, the system comprising:

a processor voltage signal indicative of supply voltage required by one or more components in a computer system during operation;

a margin voltage signal indicative of a compensated supply voltage for the computer system;

margin voltage control logic having a selection control signal for selecting between the processor voltage signal and the margin voltage signal, wherein the margin voltage control logic determines a difference between the required supply voltage and the voltage regulator output voltage, the difference being added to or subtracted from the required supply voltage to produce the margin voltage signal such that the voltage regulator output voltage will be substantially equal to the required supply voltage; and a multiplexer operable to receive the processor voltage signal, the margin voltage signal, and the selection control signal, the multiplexer being further operable to output a voltage identification signal to the voltage regulator based upon the processor voltage signal, or the margin voltage signal, whereby the selection control signal determines the multiplexer signal selection.

2. The system of claim 1, further comprising a power management microcontroller for controlling the margin voltage control logic and the multiplexer.

3. A method for biasing supply voltage requirements that are input to a voltage regulator, the method comprising:

inputting a processor voltage signal to a voltage regulator control input, wherein the processor voltage signal is indicative of supply voltage required by one or more components in a computer system during operation;

determining a difference between a regulator voltage signal indicative of the voltage regulator output voltage and the processor voltage signal;

determining a margin voltage signal by adding to or subtracting from the processor voltage signal the difference depending upon whether the regulator voltage signal is less than or greater than the processor voltage signal, respectively;

inputting the margin voltage signal to the voltage regulator control input if the regulator and processor voltage signals are not substantially equal.

4. The method of claim 3, wherein the step of determining the margin voltage signal is done with margin voltage control logic.

5. The method of claim 3, wherein the processor voltage signal and the margin control signal are selected with a multiplexer.

6. The method of claim 5, wherein the multiplexer is controlled with a power management microcontroller.

* * * * *